US012169756B2

(12) United States Patent
Manapragada

(10) Patent No.: US 12,169,756 B2
(45) Date of Patent: *Dec. 17, 2024

(54) METHOD AND APPARATUS FOR PROCESSING BANDWIDTH INTENSIVE DATA STREAMS USING VIRTUAL MEDIA ACCESS CONTROL AND PHYSICAL LAYERS

(71) Applicant: XiFi Networks R&D Inc., Cypress, TX (US)

(72) Inventor: Sai C. Manapragada, Cypress, TX (US)

(73) Assignee: XiFi Networks R&D Inc., Cypress, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,267

(22) Filed: Jul. 29, 2024

(65) Prior Publication Data

US 2024/0386226 A1 Nov. 21, 2024

Related U.S. Application Data

(63) Continuation of application No. 18/621,421, filed on Mar. 29, 2024, which is a continuation of application
(Continued)

(51) Int. Cl.
*G06K 7/10* (2006.01)
(52) U.S. Cl.
CPC ..... *G06K 7/10871* (2013.01); *G06K 7/10603* (2013.01); *G06K 7/10831* (2013.01)
(58) Field of Classification Search
None
See application file for complete search history.

(56) References Cited

U.S. PATENT DOCUMENTS

| | | |
|---|---|---|
| 5,073,899 A | 12/1991 | Collier et al. |
| 5,818,830 A | 10/1998 | Daane et al. |

(Continued)

FOREIGN PATENT DOCUMENTS

| | | |
|---|---|---|
| EP | 1878169 B1 | 1/2008 |
| EP | 2016750 B1 | 1/2009 |

(Continued)

OTHER PUBLICATIONS

Choi et al. (Jul. 14, 2014) "Envisioning 11ax PHY Structure—Part I". IEEE 11-14/0804r1. [PowerPoint presentation].
(Continued)

*Primary Examiner* — Saad Khawar
(74) *Attorney, Agent, or Firm* — Woodard, Emhardt, Henry, Reeves & Wagner, LLP

(57) ABSTRACT

A wireless networking system is disclosed. The wireless networking system includes an application layer associated with one or more applications having a wireless bandwidth requirement. A first wireless transceiver resource associated with an actual MAC layer and PHY layer is employed. The first wireless transceiver resource has a first bandwidth availability up to a first actual bandwidth. A second wireless transceiver resource associated with the actual MAC layer and the PHY layer is employed. The second wireless transceiver resource has a second bandwidth availability up to a second actual bandwidth. A processing layer evaluates the wireless bandwidth requirement and the first and second bandwidth availabilities of the wireless transceiver resources. The processing layer includes a bandwidth allocator to allocate at least a portion of each of the first and second actual bandwidths to virtual MAC and virtual PHY layers, and to satisfy the application layer wireless bandwidth requirement.

30 Claims, 11 Drawing Sheets

Related U.S. Application Data

No. 18/532,175, filed on Dec. 7, 2023, now Pat. No. 11,950,105, which is a continuation of application No. 18/448,281, filed on Aug. 11, 2023, now Pat. No. 11,849,337, which is a continuation of application No. 17/468,509, filed on Sep. 7, 2021, now Pat. No. 11,818,591, which is a continuation of application No. 16/039,660, filed on Jul. 19, 2018, now Pat. No. 11,115,834, which is a continuation of application No. 14/526,799, filed on Oct. 29, 2014, now Pat. No. 10,034,179.

(60) Provisional application No. 61/897,219, filed on Oct. 30, 2013, provisional application No. 61/897,216, filed on Oct. 30, 2013.

(56) References Cited

U.S. PATENT DOCUMENTS

| | | | |
|---|---|---|---|
| 7,373,443 B2 | 5/2008 | Seto | |
| 7,664,072 B1 | 2/2010 | Ho et al. | |
| 7,784,076 B2 | 8/2010 | Demircin et al. | |
| 7,797,723 B2 | 9/2010 | Demircin et al. | |
| 8,078,208 B2 | 12/2011 | Wolman et al. | |
| 8,175,539 B2 | 5/2012 | Diener et al. | |
| 8,279,876 B2 | 10/2012 | Chang et al. | |
| 8,363,597 B2 | 1/2013 | Abraham et al. | |
| 8,411,608 B2 | 4/2013 | Chandra et al. | |
| 8,531,946 B2 | 9/2013 | Fitch et al. | |
| 8,565,178 B2 | 10/2013 | Cheng et al. | |
| 8,619,581 B2 | 12/2013 | Trainin et al. | |
| 8,718,558 B2 | 5/2014 | Montemurro | |
| 8,767,726 B2 | 7/2014 | Petry et al. | |
| 8,818,276 B2 | 8/2014 | Kiukkonen et al. | |
| 8,837,454 B2 | 9/2014 | Hegde | |
| 8,848,608 B1 | 9/2014 | Addepalli et al. | |
| 8,848,639 B2 | 9/2014 | Porat et al. | |
| 8,897,279 B2 | 11/2014 | Seok | |
| 8,923,816 B2 | 12/2014 | Lee et al. | |
| 8,971,273 B2 | 3/2015 | Chan et al. | |
| 8,982,762 B2 | 3/2015 | Smadi et al. | |
| 8,989,101 B1 | 3/2015 | Mishra | |
| 8,989,165 B2 | 3/2015 | Ho et al. | |
| 9,055,592 B2 | 6/2015 | Clegg | |
| 9,083,568 B2 | 7/2015 | Ma et al. | |
| 9,131,511 B2 | 9/2015 | Fischer | |
| 9,160,396 B2 | 10/2015 | Soltanian et al. | |
| 9,198,184 B2 | 11/2015 | Yeh et al. | |
| 9,204,489 B2 | 12/2015 | Cordeiro | |
| 9,241,370 B2 | 1/2016 | Amini et al. | |
| 9,258,712 B2 | 2/2016 | Kiukkonen et al. | |
| 9,281,928 B2 | 3/2016 | Porat et al. | |
| 9,294,926 B2 | 3/2016 | Pragada et al. | |
| 9,320,019 B2 | 4/2016 | Gallagher et al. | |
| 9,380,470 B2 | 6/2016 | Bienas et al. | |
| 9,397,943 B2 | 7/2016 | Song | |
| 9,402,199 B2 | 7/2016 | Amini et al. | |
| 9,408,254 B2 | 8/2016 | Jain | |
| 9,467,379 B2 | 10/2016 | Merlin et al. | |
| 9,467,953 B2 | 10/2016 | Emmanuel et al. | |
| 9,516,540 B2 | 12/2016 | Emmanuel et al. | |
| 9,526,022 B2 | 12/2016 | Gupta | |
| 9,532,253 B2 | 12/2016 | Yamada et al. | |
| 9,560,656 B2 | 1/2017 | Damnjanovic et al. | |
| 9,560,661 B2 | 1/2017 | Elhaddad et al. | |
| 9,578,663 B2 | 2/2017 | Yi et al. | |
| 9,603,192 B2 | 3/2017 | Mohebbi | |
| 9,650,794 B2 | 5/2017 | Stojanovski et al. | |
| 9,699,734 B2 | 7/2017 | Seok et al. | |
| 9,706,383 B2 | 7/2017 | Kiukkonen et al. | |
| 9,716,659 B2 | 7/2017 | Dillon | |
| 9,736,714 B2 | 8/2017 | Zhao et al. | |
| 9,743,345 B2 | 8/2017 | Yen et al. | |
| 9,785,455 B2 | 10/2017 | Chandrashekhar et al. | |
| 10,027,452 B2 | 7/2018 | Cordeiro | |
| 10,034,147 B2 | 7/2018 | Shelby et al. | |
| 10,044,613 B2 | 8/2018 | Kazmi et al. | |
| 10,912,083 B2 | 2/2021 | Amini et al. | |
| 10,932,229 B2 | 2/2021 | Lou et al. | |
| 11,115,834 B2 | 9/2021 | Manapragada | |
| 11,429,407 B2 | 8/2022 | Smith et al. | |
| 2002/0152305 A1 | 10/2002 | Jackson et al. | |
| 2004/0053602 A1 | 3/2004 | Wurzburg | |
| 2004/0054766 A1 | 3/2004 | Vicente | |
| 2005/0089064 A1 | 4/2005 | Zimmerman et al. | |
| 2005/0195821 A1 | 9/2005 | Yun et al. | |
| 2006/0114851 A1 | 6/2006 | Gupta et al. | |
| 2006/0140123 A1* | 6/2006 | Conner | H04L 45/02 370/238 |
| 2007/0110198 A1 | 5/2007 | Skarby et al. | |
| 2007/0121573 A1 | 5/2007 | Zuckerman et al. | |
| 2007/0180119 A1 | 8/2007 | Khivesara et al. | |
| 2007/0242695 A1 | 10/2007 | Xu | |
| 2007/0270121 A1 | 11/2007 | Shao et al. | |
| 2008/0002631 A1 | 1/2008 | Ramachandran | |
| 2008/0084855 A1* | 4/2008 | Rahman | H04W 24/04 370/342 |
| 2009/0034460 A1* | 2/2009 | Moratt | H04W 72/569 370/329 |
| 2009/0074051 A1 | 3/2009 | Manapragada et al. | |
| 2009/0141691 A1 | 6/2009 | Jain | |
| 2009/0180451 A1 | 7/2009 | Alpert et al. | |
| 2009/0290524 A1 | 11/2009 | Seok | |
| 2010/0128630 A1 | 5/2010 | Barak et al. | |
| 2011/0110289 A1 | 5/2011 | Venkatachalam et al. | |
| 2011/0128919 A1* | 6/2011 | Kim | H04W 48/18 370/360 |
| 2011/0211541 A1 | 9/2011 | Yuk et al. | |
| 2011/0286404 A1 | 11/2011 | Abraham et al. | |
| 2012/0113320 A1 | 5/2012 | Platzer | |
| 2012/0134328 A1 | 5/2012 | Gauvreau et al. | |
| 2013/0028150 A1 | 1/2013 | Ma et al. | |
| 2013/0196653 A1 | 8/2013 | Morrison | |
| 2013/0201847 A1 | 8/2013 | Chincholi et al. | |
| 2013/0258921 A1 | 10/2013 | Gevorkov et al. | |
| 2013/0281049 A1 | 10/2013 | Lee et al. | |
| 2014/0003449 A1 | 1/2014 | Li | |
| 2014/0056209 A1 | 2/2014 | Park et al. | |
| 2014/0075189 A1 | 3/2014 | Abraham et al. | |
| 2014/0075523 A1 | 3/2014 | Tuomaala et al. | |
| 2014/0213219 A1 | 7/2014 | Mohebbi | |
| 2014/0269505 A1 | 9/2014 | Medard et al. | |
| 2014/0269560 A1 | 9/2014 | Jain et al. | |
| 2014/0269610 A1 | 9/2014 | Hiben et al. | |
| 2014/0321282 A1 | 10/2014 | Pragada et al. | |
| 2015/0023245 A1 | 1/2015 | Du et al. | |
| 2015/0098359 A1* | 4/2015 | Yen | H04W 48/16 370/254 |
| 2015/0110036 A1 | 4/2015 | Zhang et al. | |
| 2015/0181486 A1 | 6/2015 | Vallabhu et al. | |
| 2015/0237667 A1 | 8/2015 | Ghai et al. | |
| 2016/0014127 A1 | 1/2016 | Mohebbi | |
| 2016/0044711 A1 | 2/2016 | Lou et al. | |
| 2016/0157231 A1 | 6/2016 | Baldemair et al. | |

FOREIGN PATENT DOCUMENTS

| | | |
|---|---|---|
| EP | 2055072 B1 | 5/2009 |
| EP | 2330843 A1 | 6/2011 |
| EP | 2555578 A1 | 2/2013 |
| EP | 2713670 A1 | 4/2014 |
| EP | 3220697 B1 | 6/2018 |
| EP | 3174323 B1 | 11/2018 |
| GB | 2516132 A | 1/2015 |
| KR | 20070061684 A | 6/2007 |
| TW | I500350 B | 4/2015 |
| WO | WO 2014020407 A1 | 2/2014 |

OTHER PUBLICATIONS

Choi et al. (Nov. 11, 2013) "Discussion on OFDMA in HEW". LG Electronics. [PowerPoint presentation].

(56) References Cited

OTHER PUBLICATIONS

English Abstract of TWI500350B obtained from Espacenet.net on Jul. 7, 2023.
English Translation of EP2055072B1 obtained from Google Patents on Sep. 1, 2023.
English Translation of KR20070061684A obtained from Google Patents on Jan. 9, 2024.
Gong, D.; Yang, Y; and Li, H. "An Efficient Cooperative Retransmission MAC Protocol for IEEE 802.11n Wireless LANs" in: IEEE 10th International Conference on Mobile Ad-Hoc and Sensor Systems, 2013. pp. 191-199.
Hiertz et al. (Nov. 12, 2013) "Proposed direction and priorities for HEW". IEEE 11-13-1331-01. [PowerPoint presentation].
Huang et al. (Sep. 16, 2013) "DL-MU-MIMO Transmission with Unequal Bandwidth". IEEE 802.11-13/1154r1. [PowerPoint presentation].
IEEE std 802.11ac(tm)-2013. Part 11: Wireless LAN Medium Access Control (MAC) and Physical Layer (PHY) Specifications. Amendment 4: Enhancemenets for Very High Throughput for Operation in Bands below 6 GHz. IEEE Computer Society. (2013).
Inoue et al. (Mar. 19, 2013) "Beyond 802.11ac—A Very High Capacity WLAN". IEEE 11-13/0287r3. [PowerPoint presentation].
Kakumanu, S. and Sivakumar, R. "Glia: A Practical Solution for Effective High Datarate Wifi-Arrays". MobiCom '09, Sep. 20-25, 2009.
Kim et al. (Sep. 16, 2013) "Multicast Transmission for HEW". IEEE 802.11-13/1061r0. [PowerPoint presentation].
Koskela et al. (Jul. 15, 2013) "Discussion on Potential Techniques for HEW". IEEE 802.11-13/0871r0. [PowerPoint presentation].
Li, H. and Xie, J. "A Channel Splitting Strategy for Reducing Handoff Delay in Internet-Based Wireless Mesh Networks" in: IEEE Transactions on Vehicular Techonolgy, (Jul. 2012), vol. 61, No. 6. pp. 2740-2752.
Lim et al. (Jul. 14, 2014) "Envisioning 11ax PHY Structure—Part II". IEEE 11-14/0801r0. [PowerPoint presentation].
Liu et al. (May 9, 2013) "Discussions on 11ac PHY Efficiency". IEEE 802.11-13/0544r3. [PowerPoint presentation].
Prasad, S.S; Shukla, C.K.; and Chisab, R.F. "Performance Analysis of OFDMA in LTE" in: IEEE (Jul. 26-28, 2012).
Raman, V. and Vaidya, N.H. "WiSP: A Protocol for Overcoming MAC Overheads Using Packet Size Dependent Channel Widths" in: 8th Annual IEEE Communications Society Conference on Sensor, Mesh and Ad Hoc Communications and Networks, 2011. pp. 28-36.
Selvakumar, V.; Nemalladinne, S.S.; and Arumugam, P. "Analysis of LTE Radio Frame by eliminating Cyclic Prefix in OFDM and comparison of QAM and Offset-QAM". Degree project. Linnaeus University, Sep. 10, 2012.
U.S. Appl. No. 61/835,488, entitled "WLAN Sensor Gateway With Coexistence Solution", filed Jun. 14, 2013.
U.S. Appl. No. 61/836,571, entitled "Coexistence and Traffic Management for Using Multiple WLAN Radios in a System", filed Jun. 18, 2013.
U.S. Appl. No. 61/870,762, entitled "Coexistence and Traffic Management With Alignment of Packets and Channel Steering", filed Aug. 27, 2013.
U.S. Appl. No. 61/888,692, entitled "Wireless Design for Using a Routers or Residential Gateway as Sensor Gateway", filed Oct. 9, 2013.
U.S. Appl. No. 61/890,713 entitled "Simultaneous Usage of Different WLAN Modules", filed Oct. 14, 2013.
U.S. Appl. No. 61/824,338 entitled "Advanced Wireless Communication Systems and Techniques", filed May 16, 2013.
Wee et al. "Discretionary bandwidth granting scheme for homogenous real-time applications". EURASIP Journal on Wireless Communications and Networking (2013). http://jwcn.eurasipjournals.com/content/203/1/135.
Yang et al. (Sep. 18, 2013) "Discussion on Access Mechanism for HEW". IEEE 11-13/1105r0. [PowerPoint presentation].
U.S. Appl. No. 61/788,556, entitled "Multi-Band Operation for Wireless LAN Systems", filed Mar. 15, 2013.
U.S. Appl. No. 61/843,797, entitled "Wireless Load Balancing in WLAN Networks", filed Jul. 8, 2013.
U.S. Appl. No. 61/890,309, entitled "Virtual Distributed Router", filed Oct. 13, 2013.

\* cited by examiner

METHOD AND APPARATUS FOR PROCESSING BANDWIDTH INTENSIVE DATA STREAMS USING VIRTUAL MEDIA ACCESS CONTROL AND PHYSICAL LAYERS

CROSS-REFERENCE TO RELATED APPLICATIONS

This application is a continuation of U.S. patent application Ser. No. 18/621,425 filed Mar. 29, 2024, titled "Method and Apparatus for Processing Bandwidth Intensive Data Streams Using Virtual Media Access Control and Physical Layers", which claims the benefit of U.S. patent application Ser. No. 18/532,175 filed Dec. 7, 2023, titled "Method and Apparatus for Processing Bandwidth Intensive Data Streams Using Virtual Media Access Control and Physical Layers", now U.S. Pat. No. 11,950,105, which claims the benefit of U.S. patent application Ser. No. 18/448,281 filed Aug. 11, 2023, titled "Method and Apparatus for Processing Bandwidth Intensive Data Streams Using Virtual Media Access Control and Physical Layers", now U.S. Pat. No. 11,849,337, which claims the benefit of U.S. patent application Ser. No. 17/468,509 filed Sep. 7, 2021, titled "Method and Apparatus for Processing Bandwidth Intensive Data Streams Using Virtual Media Access Control and Physical Layers", now U.S. Pat. No. 11,818,591, which claims the benefit of U.S. patent application Ser. No. 16/039,660, filed Jul. 19, 2018, titled "System and Method For Extending Range and Coverage of Bandwidth Intensive Wireless Data Streams", now U.S. Pat. No. 11,115,834, which claims the benefit of U.S. patent application Ser. No. 14/526,799, filed Oct. 29, 2014, titled "System and Method For Extending Range and Coverage of Bandwidth Intensive Wireless Data Streams", now U.S. Pat. No. 10,034,179, which claims the benefit of U.S. Provisional Patent Application Ser. No. 61/897,219, filed Oct. 30, 2013, and U.S. Provisional Patent Application Ser. No. 61/897,216, filed Oct. 30, 2013, all of which are incorporated by reference herein in their entirety.

TECHNICAL FIELD

The disclosure herein relates to wireless networks, and more specifically to high-bandwidth wireless networks for distributing multi-media content.

BACKGROUND

Wireless networks may take many forms, depending on the application. Various WiFi standards exist where users within range of a "hotspot" may establish a wireless link to access a given network. A given hotspot, or wireless access point, typically has a limited range and coverage area. WiFi and cellular technologies rely on very different wireless radios and data protocols in transferring data over the network.

With the proliferation of multi-media content over wireless networks comes an insatiable demand for more bandwidth over the networks. Conventional wireless networking architectures fail to provide adequate resources to efficiently provide optimum range and coverage for wireless network users, and fail to take full advantage of the resources available to satisfy the desire for more bandwidth.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of wireless networking systems, wireless transceivers and associated methods are disclosed herein. In one embodiment, a wireless networking system is disclosed. The wireless networking system includes an application layer associated with one or more applications having a wireless bandwidth requirement. A first wireless transceiver resource associated with an actual MAC layer and PHY layer is employed. The first wireless transceiver resource has a first bandwidth availability up to a first actual bandwidth. A second wireless transceiver resource associated with the actual MAC layer and the PHY layer is employed. The second wireless transceiver resource has a second bandwidth availability up to a second actual bandwidth. A processing layer evaluates the wireless bandwidth requirement and the first and second bandwidth availabilities of the wireless transceiver resources. The processing layer includes a bandwidth allocator to allocate at least a portion of each of the first and second actual bandwidths to virtual MAC and virtual PHY layers, and to satisfy the application layer wireless bandwidth requirement.

In a further embodiment, a method of a method of operating a wireless transceiver system is disclosed. The wireless transceiver system includes an application layer, actual MAC and PHY layers, and a processing layer between the actual MAC and PHY layers. The method includes evaluating, with processing logic, application bandwidth requirements of applications associated with the applications layer. A virtual MAC layer and a virtual PHY layer are defined between the processing layer and the actual MAC and PHY layers. A bandwidth allocator allocates multiple wireless transceiver resources in the actual MAC and PHY layer to be controlled by the virtual MAC and PHY layer to satisfy the application bandwidth requirements. A stream of processed data is transferred via a wireless link with the allocated wireless transceiver resources.

In yet another embodiment, a wireless transceiver for coupling to a wireless duplex link is disclosed. The wireless transceiver includes programmable storage, a transmitter and a receiver. The transmitter couples to the programmable storage and transmits data along a wireless link during a first portion of a programmed data transfer cycle. The receiver couples to the programmable storage and receives data from the wireless link during a second portion of the programmed data transfer cycle. The wireless link exhibits an asymmetric transmit/receive profile based on information stored in the programmable storage.

Figure 1:
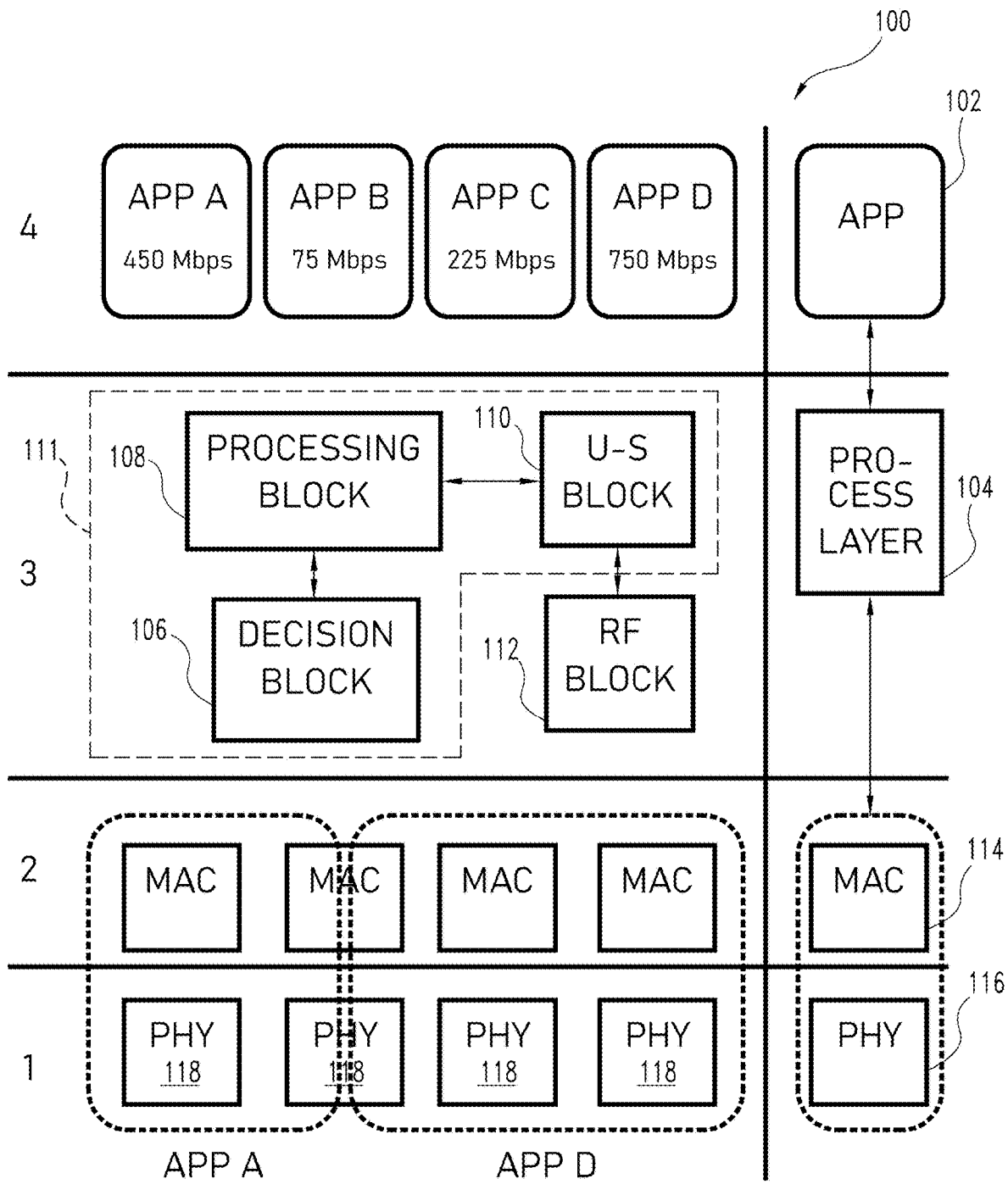
FIG. 1 illustrates one embodiment of a virtualization mode and an actual mode for processing wireless signals.

Referring to FIG. 1, one embodiment of a wireless networking system, generally designated 100, is shown in an abstract "layer" context. Generally speaking, the system may involve a WiFi network, a mobile wireless network, or a combination of the two. The network includes an application layer "APP", at 102, with one or more data-intensive software applications "APP A"-"APP D." The individual applications, for example, may have different peak bandwidth requirements in terms of data transfer rates. Thus, for instance, application APP A may have a peak bandwidth requirement of 450 Megabits per second (Mbps), while application APP D may have a peak bandwidth requirement of 750 Mbps.

Further referring to FIG. 1, the application layer 102 cooperates with a process layer, at 104. The process layer includes a decision block 106 that interfaces with a processing block 108. The decision block determines the size and type of data stream being received, and the type of processing necessary to put the stream in a format where it is capable of being transmitted. The processing block processes the data stream as determined by the decision block, and couples to an ultra-streaming block 110. The ultra-streaming block manages the processing of signal streams or sub-streams given the available resources (memory, processing speed, number of available radios, etc.), and packetizes sufficiently processed streams or sub-streams. The ultra-streaming block feeds data to and from an RF block 112. While not explicitly shown in FIG. 1, the ultra-streaming block carries out a monitoring function, more fully described below, that feeds back wireless resource availability to the decision block 106. Various ways for determining availability of resources include common memory, host interfaces, common threads, and/or queues or other data structures.

The decision block 106, processing block 108 and ultra-streaming block 110 together form a virtual MAC layer 111. The RF block 112 forms a virtual PHY layer. As more fully described below, the virtual MAC and PHY layers enable simultaneous allocation of multiple PHY resources for different signal types associated with different applications. As a result, the wireless networking system 100 exhibits significant performance improvements and efficiency advantages.

With continued reference to FIG. 1, the wireless networking system 100 includes an actual media access control (MAC) layer, at 114, and an actual physical (PHY) layer, at 116. The actual MAC layer 114 generally includes software resources capable of controlling one or more transceiver resources 118 that are at the actual PHY layer, such as various radios and receivers. The actual PHY layer 116 may include multiple transceiver resources corresponding to multiple radios, each with an actual data transfer capability, or bandwidth.

The actual PHY layer transceivers may transmit and receive data consistent with a variety of signal protocols, such as High Definition Multimedia Interface (HDMI) consistent with the IEEE 802.11 Standard, Multiple-In Multiple-Out (MIMO), standard Wi-Fi physical control layer (PHY) and Media Access Control (MAC) layer, and existing IP protocols. Additionally, extremely high bandwidth applications such as Voice Over IP (VOIP), streaming audio and video content, multicast applications, convergent and ad-hoc network environment may employ signal protocols consistent with the wireless network system described herein. Additionally, the wireless networking system may be employed and/or embedded into a variety of electronic devices, including wireless access points, base stations, handhelds, tablets, computers, telephones, televisions, DVD players, BluRay players, media players, storage devices, or any such devices that use wireless networks to send and receive data including stand-alone add-on devices such as "dongles" that serve as wireless interfaces between devices.

Figure 2:
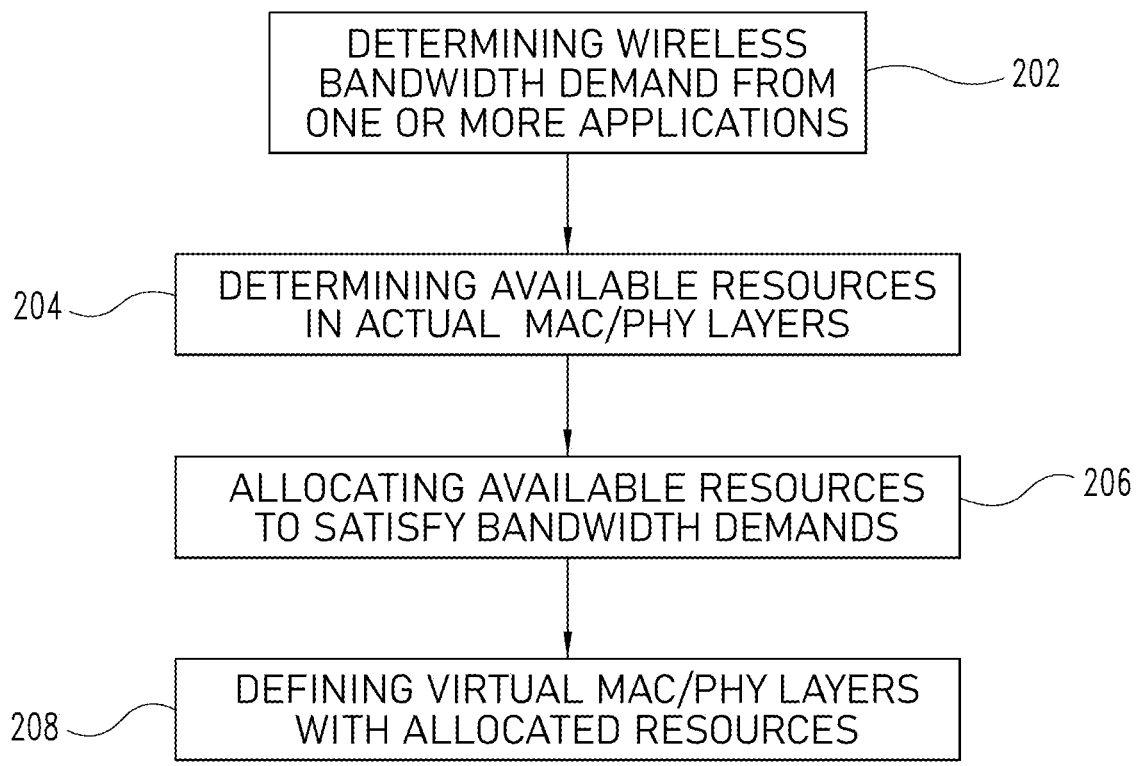
FIG. 2 illustrates a flowchart of steps employed in one embodiment of a method of operation of the system of FIG. 1.

In operation, and referring to FIG. 2, the wireless networking system generally determines an overall wireless bandwidth demand or requirement from one or more applications associated with the application layer 102, at 202. FIG. 1 illustrates one example, with Application A demanding a peak bandwidth of 450 Mbps, and Application D requiring a peak bandwidth of 750 Mbps. At 204, the process layer 104 determines available resources in the actual MAC and PHY layers 114 and 116, and allocates the available resources to satisfy the bandwidth demands, at 206.

Using the same example shown in FIG. 1, and assuming that all of the PHY transceivers are available, each PHY transceiver 118 is capable of providing a transmit/receive bandwidth of 300 Mbps. Grouping the entire bandwidth of one transceiver with half the bandwidth of a second satisfies the bandwidth demand for Application A. In a similar manner, allocating the bandwidths of two transceivers, and half the bandwidth of a third transceiver satisfies the bandwidth demand for Application D. The allocating is managed by defining the virtual MAC/PHY layers 111 and 112 with the allocated resources, at 208.

Figure 3:
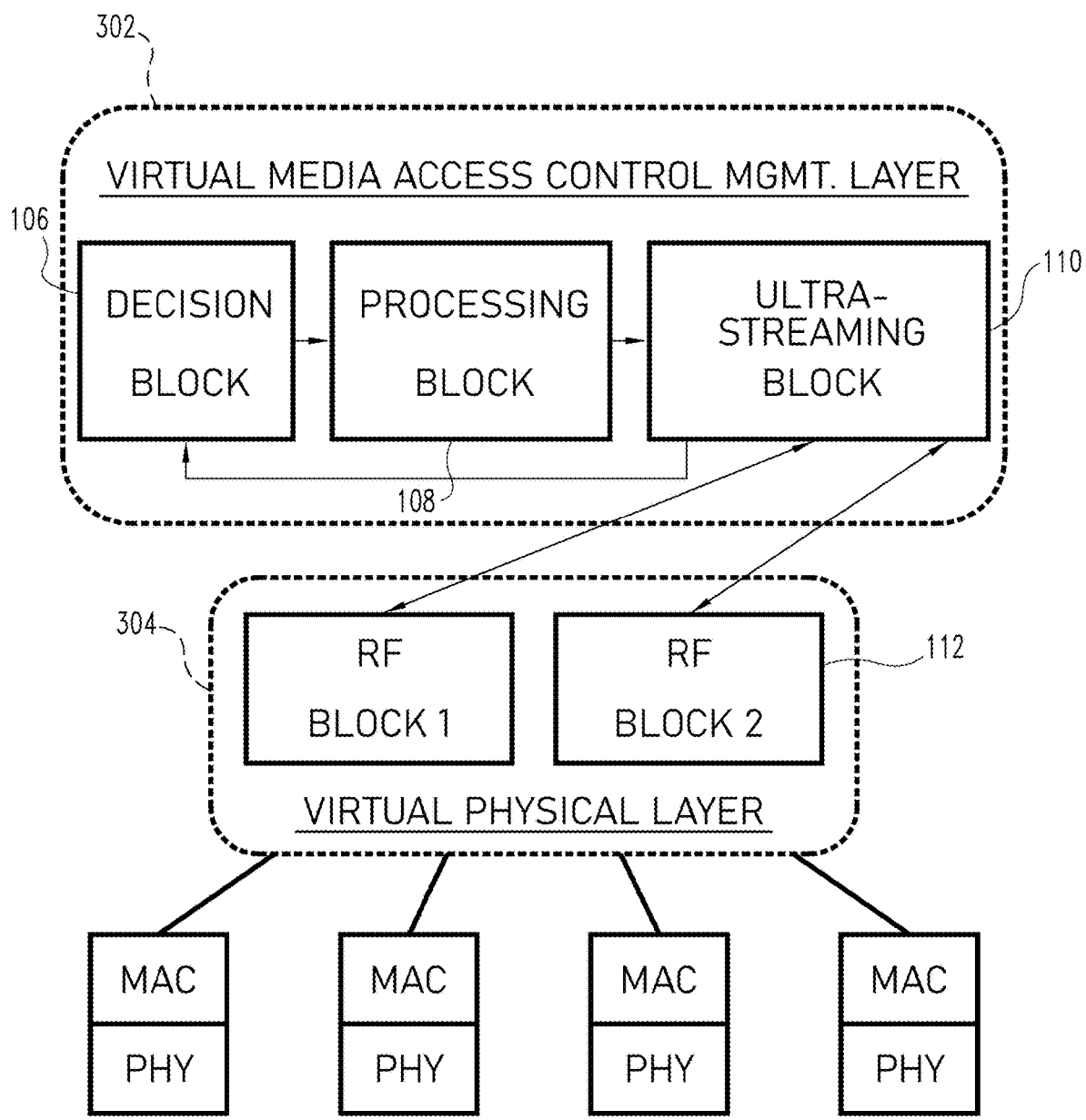
FIG. 3 illustrates how a virtual MAC and virtual PHY are coordinated to manage actual MAC and PHY layers.

FIG. 3 illustrates how, in one embodiment, elements associated with the process layer 104 can define a virtual MAC management layer 302 and a virtual PHY layer 304 to enable the sharing of multiple transceiver resources in a way sufficient to satisfy the bandwidth requirements of multiple applications running simultaneously. The virtual MAC and PHY layers manage signals from one or more applications before sending the signals to the actual MAC and PHY layers. The virtual MAC management layer 302 may include the decision block 106, the processing block 108 and the ultra-streaming block 110. The virtual PHY layer 304 may include the RF block 112, shown as multiple RF blocks to denote the virtual use of two sets of allocated transceiver resources. For one embodiment, the RF block(s) communicate directly with the ultra-streaming block about actual resource availability, and the ultra-streaming block sends the information back to the decision block in the virtual MAC layer. Alternatively, the virtual PHY RF block may directly communicate with the virtual MAC decision block and/or the processing block.

Figure 4:
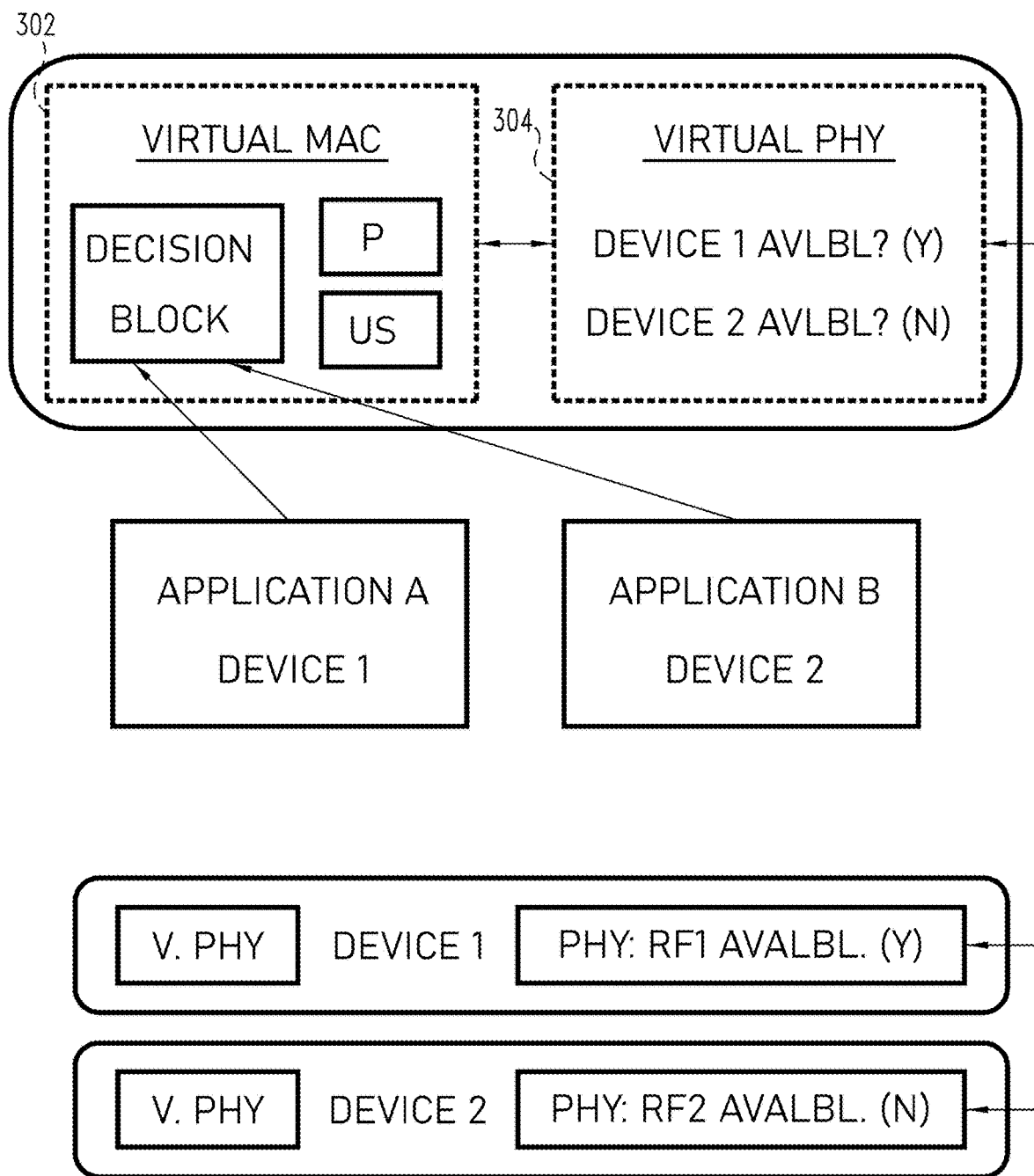
FIG. 4 illustrates how the system of FIG. 2 manages signal processing by determining which resources are available.

Referring now to FIG. 4, defining the virtual MAC and PHY layers 302 and 304 involves an evaluation of available transceiver resources to meet peak bandwidth demands of applications running in the application layer. One or more applications, such as "Application A" and "Application B", may be initially supported with transceiver resources "Device 1" and "Device 2" through an initialization or training process at startup. The virtual MAC 302 interfaces with the virtual PHY 304 to determine device availability. This further involves a determination at the PHY layer as to the actual availability of the initially assigned transceiver resources. Should a given resource be unavailable, such as through insufficient bandwidth or having an existing assignment, a replacement resource may be identified and assigned. Availability monitoring may be carried out at initialization, as described above, or through periodic or continuous updating based on environmental conditions or through random on demand programming. Adaptively managing the actual resources provides efficient utilization of resources and power.

Figure 5A:
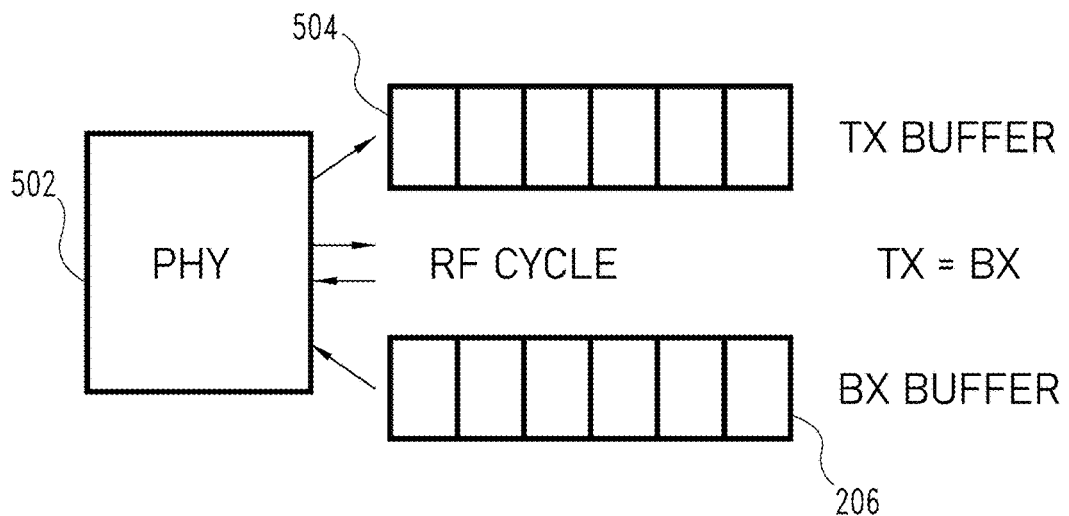
FIGS. 5A and 5B illustrate alternative ways to manage one embodiment of a variable-duplex link.

For one embodiment, the virtual MAC 302 and virtual PHY 304 may be employed to control respective transmit and receive times (also referred to as an RF cycle) for a transceiver coupled to a variable duplex wireless link. FIG. 5A illustrates a way of ensuring an RF cycle that has a transmit time equal to a receive time, such that a first amount of data is transmitted along a given link that is equal to a second amount of data that is received along the link. A physical resource PHY 502, such as a wireless transceiver, is shown coupled to a transmit buffer 504 and a receive buffer 506. By providing transmit buffer storage that is equal to the receive buffer storage, the amount of data transmitted during both portions of the cycle is equal (since the transceiver generally transmits and receives the entire contents of a given buffer before switching to the next portion of the cycle).

Figure 5B:
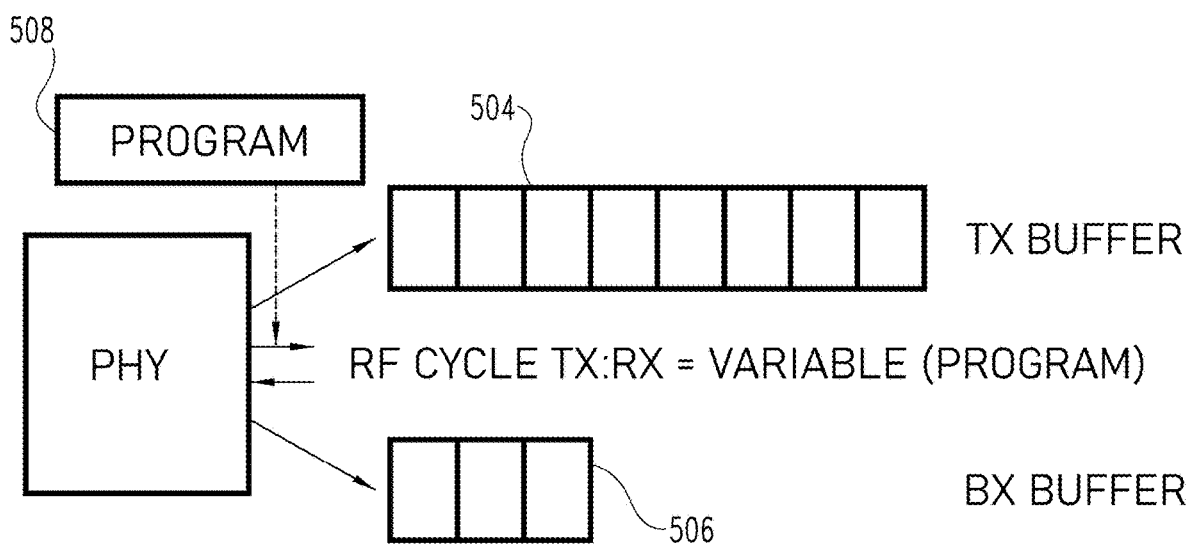

While equal transmit and receive portions of the RF cycle may be beneficial in some circumstances, allocating different PHY resources for different applications, as described above, may benefit from asymmetric wireless links, where the transmit or receive times may be different to optimize wireless data traffic. FIG. 5B illustrates one embodiment of a variable duplex link that includes a transmit buffer 504 that is larger than a receive buffer 506. A programmable register 508 provides a way to specify the storage capacities of each of the buffers, thus enabling control of the respective transmit and receive time. In another embodiment, the programmable register may include storage to specify precise transmit and receive times for the RF cycle in addition to, or instead of varying the buffer sizes. For some embodiments, sub-programmable mask intervals may be programmed which disable a given transmitter or receiver during the pre-programmed transmit or receive time.

Figure 6:
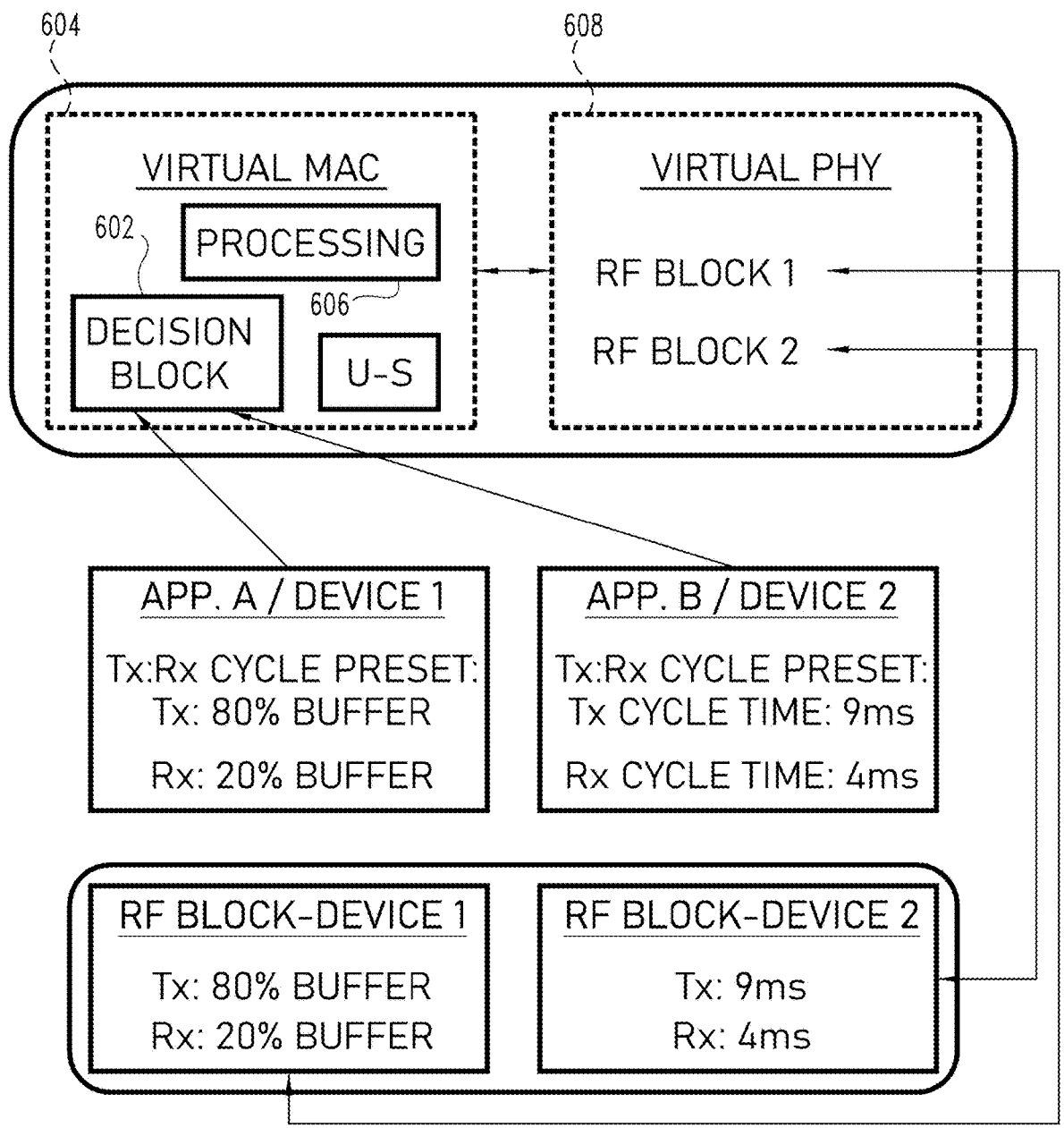
FIG. 6 illustrates one embodiment of a variable duplex link that is configurable to manage transmit and receive process cycles, including preset process cycle configurations of different types.

FIG. 6 illustrates one embodiment of the wireless networking system, described above, utilizing the variable duplex link to optimize uplink (transmit) and downlink (receive) data transfer efficiency for a given application. As shown in FIG. 6, a decision block 602 associated with a virtual MAC 604 detects application types, APP A and APP B, for which a preset transmit/receive cycle ratio has been assigned. A processing block 606 processes the substream signals together with the preset cycle ratio information. A virtual PHY 608, configures available devices to the preset cycle ratio in terms of either configuring transmit and receive buffer sizes, and/or configuring actual transmit and receive cycle times.

The virtual MAC and PHY layers 604 and 608 may also be used to reconfigure, or update, the RF cycle times of the link periodically or continuously. Additionally, random on-demand programming may be employed to reconfigure the link. By monitoring parameters associated with the link, a predictive model of optimal link operation may be adaptively generated, resulting in enhanced link operability.

Those skilled in the art will appreciate that the embodiments described above enable wireless networking systems to operate at higher levels of performance and with better efficiencies. By employing a virtual MAC and virtual PHY between an application layer and an actual MAC and PHY layer, wireless transceiver resources may be allocated more efficiently to handle various data bandwidth requirements from different applications. Additionally, by selectively employing a variable duplex link, data transfers may be further optimized through finer control of link transmit and receive times.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Further embodiments of wireless networking systems, wireless transceivers and associated methods are disclosed herein. In one embodiment, a wireless networking system is disclosed. The system includes a first wireless access point having a first coverage area. The first wireless access point includes a first wireless transceiver to access a wireless network and a second wireless transceiver coupled to the first wireless transceiver. A second wireless access point has a second coverage area. The second wireless access point includes a third wireless transceiver for establishing a wireless link with the second wireless transceiver, and a fourth wireless transceiver coupled to the third wireless transceiver to provide user access to the wireless link. User access to the wireless link accesses the wireless network via the second and first wireless transceivers.

In a further embodiment, a method of providing wireless network access to a user is disclosed. The method includes accessing a wireless network with a first wireless transceiver associated with a first wireless access point. The first wireless access point has a first coverage area bounded by a range of a first broadcast transceiver associated with the first wireless access point. Wireless access to the wireless network is enabled within the first coverage area with the first broadcast transceiver. A wireless link is established between the first wireless access point and a third wireless transceiver associated with a second wireless access point. The second wireless access point has a second coverage area bounded by a fourth wireless transceiver. The fourth wireless transceiver is in communication with the third wireless transceiver. Access to the wireless network from within the second coverage area is enabled via the fourth wireless transceiver.

In yet another embodiment, a wireless access point for use in a wireless networking system, the wireless access point includes a first wireless transceiver to establish a wireless link to a wireless network. A second wireless transceiver provides wireless access to the wireless link within a first coverage area. A third wireless transceiver establishes a wireless link to a second wireless access point. Processing logic controls each of the first, second and third wireless transceivers.

Figure 7:
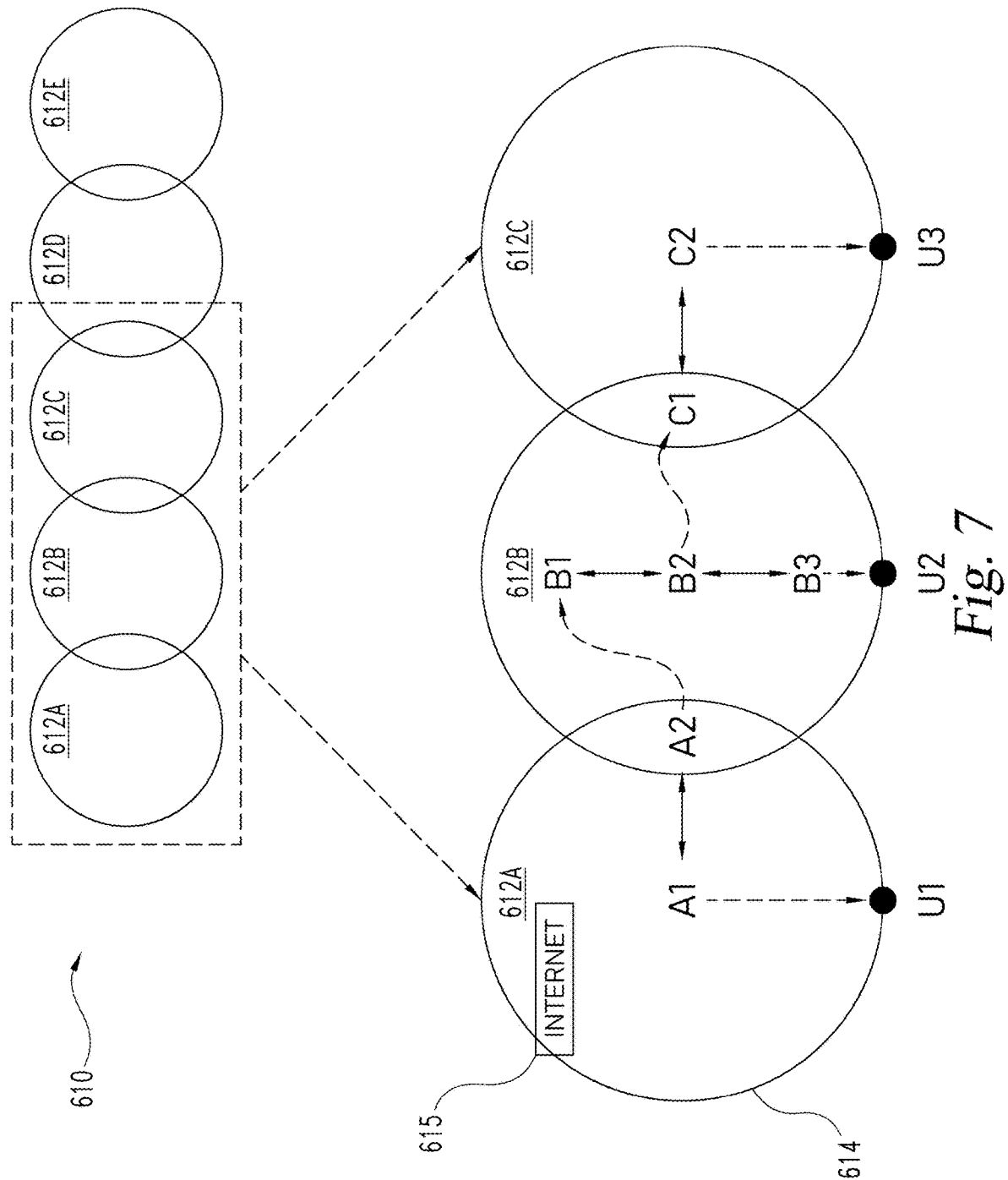
FIG. 7 illustrates one embodiment of a system for wirelessly extending range of a wireless network linearly from one access point to another.

Referring to FIG. 7, one embodiment of a wireless networking system is shown, generally designated 610, that increases the range of wireless network access. The wireless networking system 610 includes multiple wireless access points, or nodes, 612A-612E. The nodes may be positioned linearly, such as in serial or wirelessly daisy-chained arrangement, to linearly extend wireless network access across multiple access point coverage zones. A similar embodiment that extends coverage radially is described below with reference to FIGS. 10A-10C.

With continued reference to FIG. 7, for one specific embodiment, node 612A includes multiple radios A1 and A2. Radio A1 is configured as a receiver/transmitter (transceiver) that exhibits a wireless transceiver range, denoted by the circle at 614, to receive and transmit signals to a network, such as the Internet 615. Note that for purposes of clarity, each node is shown in FIG. 7 as having a range defined by the range of one of the radios. Radio A1, while acting as a receiver/transmitter (often referred to herein as a transceiver) is also able to broadcast and receive signals within its coverage area to users that are in the area 614, thereby serving as a wireless access point for that area. User U1 thus may access the Internet via radio A1. Radio A1 also communicates with a relay radio A2, which may be disposed near the periphery of the range 104 of radio A1. Relay radio A2 has a similar range as radio A1, and is able to communicate with radio B1 that is associated with node 612B. For some embodiments, the relay radio (such as radio A2) for a given node is assigned to one or more dedicated transceivers (such as B1) associated with respective adjacent nodes. Additionally, in general, the transceivers of a given node can communicate to any of the transceivers available in adjacent nodes.

Further referring to FIG. 7, node 612B includes three radios, one to establish communication with radio A2 of node 612A, a second radio B2 to act as a relay to a third node 612C, and a third radio B3 to act as a wireless access point to a second user U2 within the node 102B. The third node 102C includes a first radio C1 to communicate with the second radio B2 of the second node 612B, and a second radio C2 to provide wireless access to a third user U3 within the access coverage area of the third node 612C. Thus, with communication links established from the Internet to radio A1, to radio A2, to radio B1 to radio B2 to radio C1 and to radio C2, the user U3 is able to access the Internet wirelessly even though the distance between the user U3 to the first wireless access point A1 exceeds the coverage or range of radio A1.

Each node 612A-612C described above, may be configured differently depending on the available resources and bandwidth demands. Thus, a given radio may handle multiple tasks to receive and broadcast simultaneously, if the bandwidth demands are relatively low, or handle a single task, such as relay radio A2, if the bandwidth demand necessitates the need for additional wireless transceiver resources.

Figure 8:
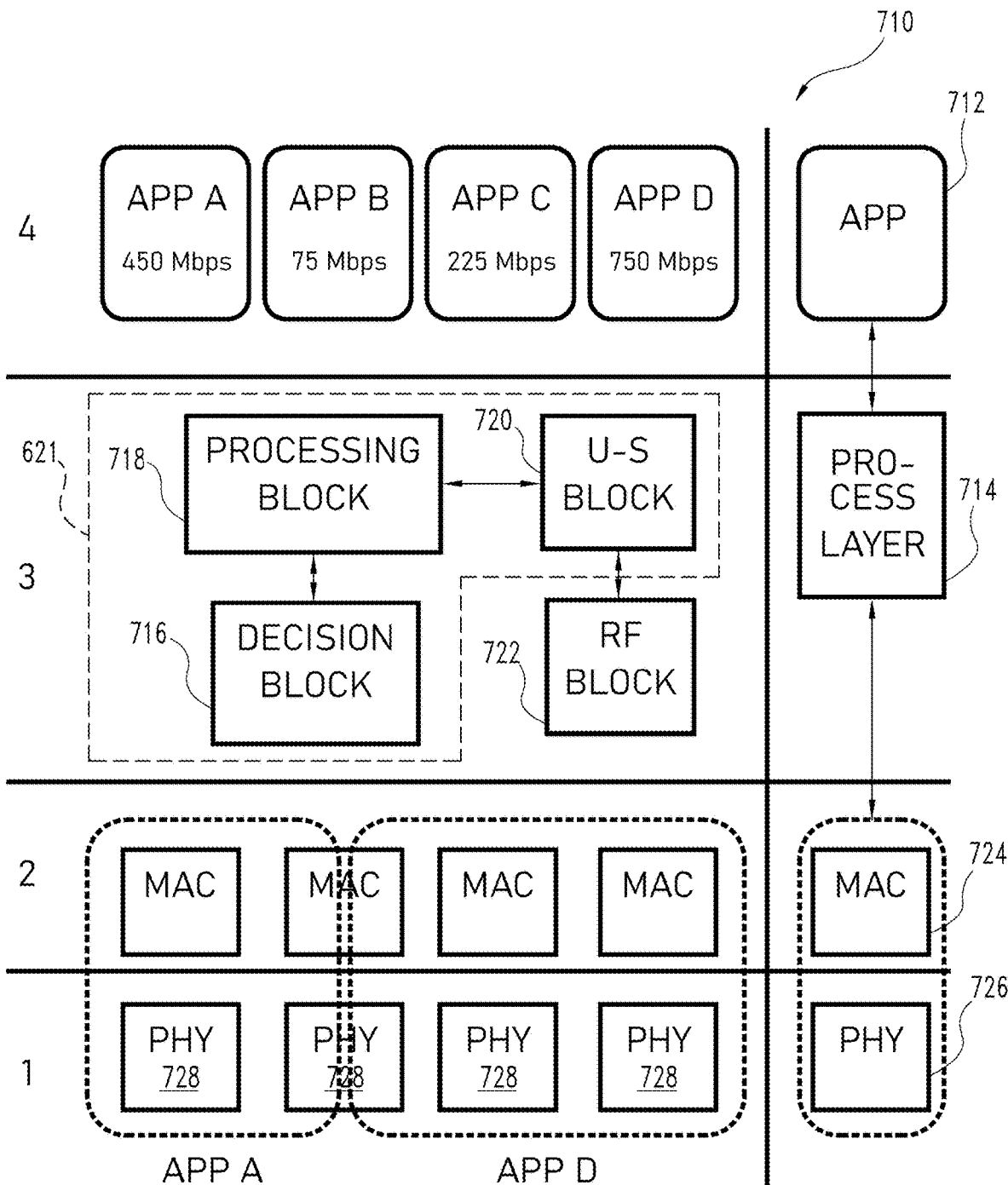
FIG. 8 illustrates a wireless management system that utilizes a virtual MAC and virtual PHY to wirelessly and adaptively manage and control multiple radios in a given wireless access point.

To manage the allocation and configuration of wireless transceiver resources, each node employs a management system, such as one embodiment shown in FIG. 8, and generally designated 710. The management systems for multiple nodes thus forms distributed logic that cooperate to efficiently manage bandwidth utilization for users. Further details of the management system for a variety of applications are disclosed in U.S. Pat. No. 9,788,305, titled METHOD AND APPARATUS FOR PROCESSING BANDWIDTH INTENSIVE DATA STREAMS USING VIRTUAL MEDIA ACCESS CONTROL AND PHYSICAL LAYERS, filed Oct. 29, 2014, and expressly incorporated herein by reference.

Further referring to FIG. 8, one specific embodiment of the management system 710, is shown in a networking "layer" context. Generally speaking, the wireless management system may be configured for coupling an available transceiver resource to a WiFi network, a mobile wireless network, or a combination of the two. The management system 710 includes an application layer "APP", at 712, with one or more data-intensive software applications "APP A"-"APP D." The individual applications, for example, may have different peak bandwidth requirements in terms of data transfer rates. Thus, for instance, application APP A may have a peak bandwidth requirement of 450 Megabits per second (Mbps), while application APP D may have a peak bandwidth requirement of 750 Mbps.

Further referring to FIG. 8, the application layer 712 cooperates with a process layer, at 714. The process layer includes a decision block 716 that interfaces with a processing block 718. The decision block determines the size and type of data stream being received, and the type of processing necessary to put the stream in a format where it is capable of being transmitted. The processing block processes the data stream as determined by the decision block, and couples to an ultra-streaming block 720. The ultra-streaming block manages the processing of signal streams or sub-streams given the available resources (memory, processing speed, number of available radios, etc.), and packetizes sufficiently processed streams or sub-streams. The ultra-streaming block feeds data to and from an RF block 722. While not explicitly shown in FIG. 8, the ultra-streaming block carries out a monitoring function, more fully described below, that feeds back wireless resource availability to the decision block 716. Various ways for determining availability of resources include common memory, host interfaces, common threads, and/or queues or other data structures.

The decision block 716, processing block 718 and ultra-streaming block 720 together form a virtual MAC layer 621. The RF block 722 forms a virtual PHY layer. The virtual MAC and PHY layers enable simultaneous allocation of multiple PHY resources for different signal types associated with different applications. Transceiver configurations may be applied at initialization of the system, periodically during normal operation, or randomly on demand during operation. As a result, the most efficient path for wireless access between a given user and the wireless network is paved. The wireless networking system 710 thus exhibits significant performance improvements and efficiency advantages.

With continued reference to FIG. 8, the wireless management system 710 includes an actual media access control (MAC) layer, at 724, and an actual physical (PHY) layer, at 726. The actual MAC layer 724 generally includes software resources capable of controlling one or more transceiver resources 728 that are at the actual PHY layer, such as various radios and receivers. The actual PHY layer 726 may include multiple transceiver resources corresponding to multiple radios, each with an actual data transfer capability, or bandwidth.

The actual PHY layer transceivers may transmit and receive data consistent with a variety of signal protocols, such as High Definition Multimedia Interface (HDMI) consistent with the IEEE 802.11 Standard, Multiple-In Multiple-Out (MIMO), standard Wi-Fi physical control layer (PHY) and Media Access Control (MAC) layer, and existing IP protocols. Additionally, extremely high bandwidth applications such as Voice Over IP (VOIP), streaming audio and video content, multicast applications, convergent and ad-hoc network environment may employ signal protocols consistent with the wireless network system described herein. Additionally, the wireless management system may be employed and/or embedded into a variety of electronic devices, including wireless access points, base stations, handhelds, tablets, computers, telephones, televisions, DVD players, BluRay players, media players, storage devices, or any such devices that use wireless networks to send and receive data including stand-alone add-on devices such as "dongles" that serve as wireless interfaces between devices.

Figure 9:
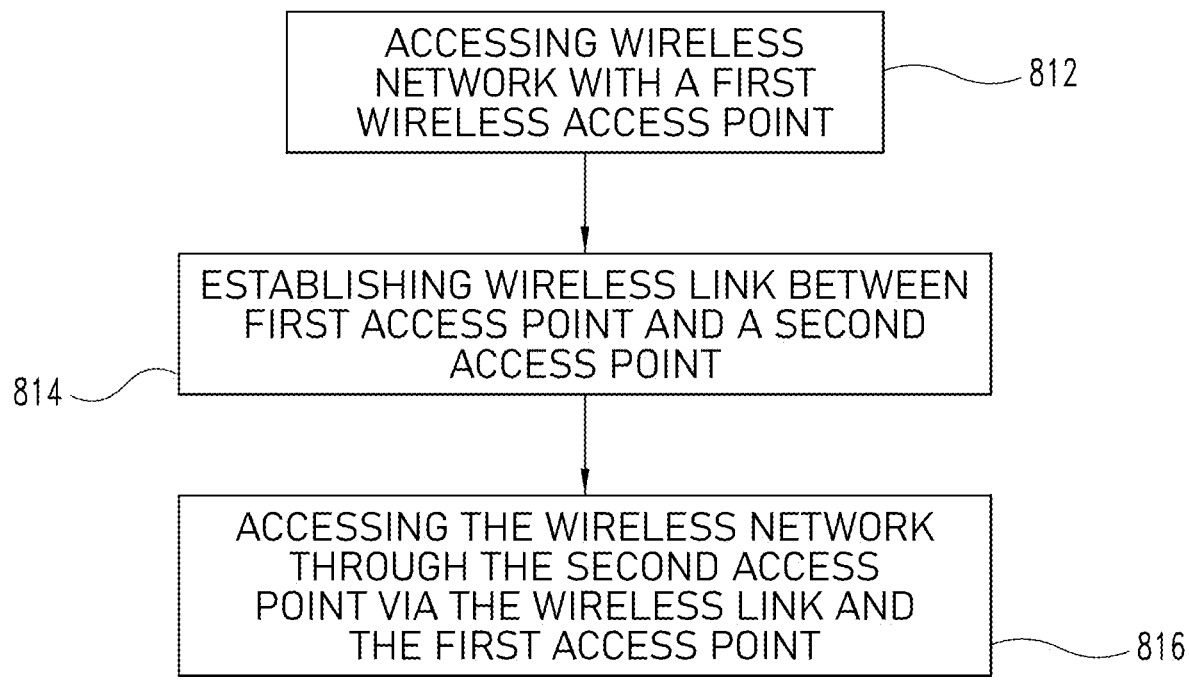
FIG. 9 illustrates a flowchart of steps for one embodiment of a method of wirelessly accessing a wireless network, consistent with the systems shown in FIGS. 1 and 2.

FIG. 9 illustrates a flowchart that shows generic steps carried out during operation of the wireless networking system of FIG. 7. At 812, the first node 612A (FIG. 7) accesses a wireless network, such as the Internet 615, with a first radio or transceiver A1. A second transceiver A2, establishes a wireless link with the first transceiver A1, at 814. The second transceiver may then act as a relay to establish a further link with a radio in a different node, such as radio B1 in node 612B. The wireless network may then be accessed through the different node 612B via the wireless link (between radios B1 and A2) and the first access point, at 816. By employing a plurality of transceivers at each of the nodes that run the Ultra Streaming engine to allocate their available resources, either at initialization as configurable, or while in operation periodically, or dynamically in random demand while in operation, the most efficient path for wireless access is accomplished. This results in increased range and coverage for a given wireless network, and it's Internet access.

Figure 10A:
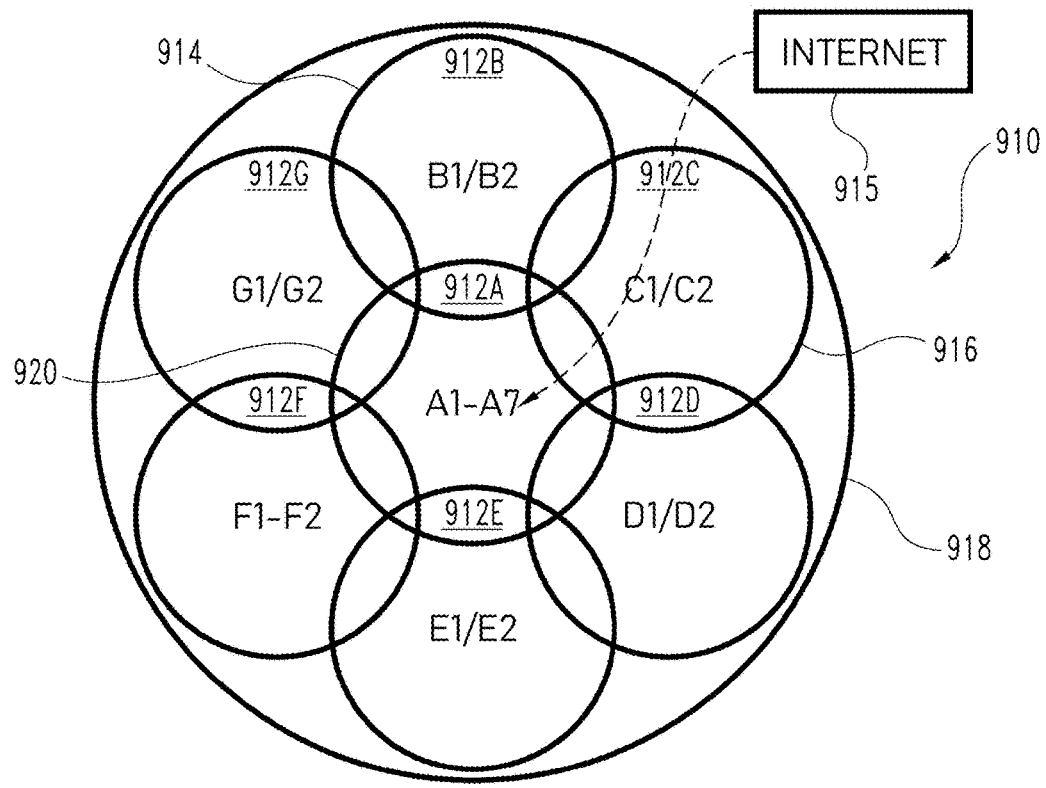
FIG. 10A-10C illustrate embodiments of a system for wirelessly extending range of a wireless network radially from one access point to other access points.
Figure 10B:
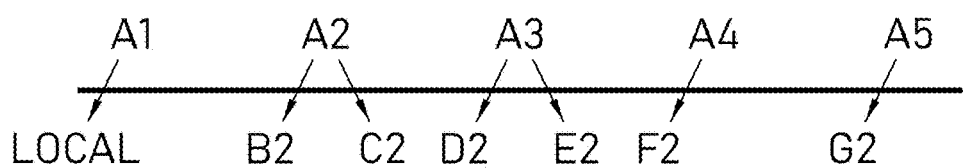
Figure 10C:
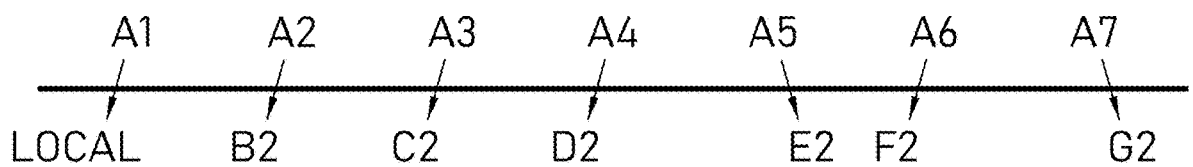

FIGS. 10A-10C illustrate a further embodiment of a wireless networking system, generally designated 910, that is similar to the system of FIG. 7, but configured with various nodes 912A-912G that are positioned in a relative manner to extend coverage radially, rather than linearly. Each of the nodes includes a wireless management system, such as that shown in FIG. 8 and described above.

Further referring to FIG. 10A, a first node 912A includes radios A1-A7, with radio A1 acting as an originating access point for a local network signal, such as the Internet 915. The remaining radios A2-A7 may then be configured to communicate with specified adjacent nodes. The adjacent nodes have respective coverage zones that overlap the primary node 912A radially outwardly. Thus, by encircling the primary node with the other nodes, the corresponding coverage area may be increased dramatically.

FIG. 10B illustrates one configuration where radio A1 acts as the originating radio to communicate with the local wireless network, and radio A2 communicates the network signal as a relay with radios B2 and C2 of nodes 912B and 912C. Radios B1 and C1 of each respective node broadcast wireless access to users within the respective coverage zones, bounded by coverage rings 914 and 916 associated with each respective node 912B and 912C. Similar arrangements are managed with radio A3 communicating with radios D2 and E2, and radios A4 and A5 communicating with F2 and G2, respectively. To optimize coverage radially, the nodes 912B-912G are positioned radially around the primary node 912A in a honeycomb structure. The resulting coverage boundary, represented by the coverage circle 408, is significantly larger than the originating access coverage area (represented by ring 410) provided by the broadcast radio associated with node 402A by itself.

FIG. 10C illustrates different assignments of the radios in the wireless networking system of FIG. 10A managed by the wireless management system 910 of each node 912A-912G.

The assignments and radio configurations may be defined and managed during an initialization process, periodically during operation, or randomly on demand depending on the bandwidth demands of the system. Thus, if bandwidth demands are higher in nodes 912B and 912C, then instead of sharing the bandwidth of radio A2 with nodes 912B (radio B2) and 912C (radio C2), such as the arrangement of FIG. 10B, dedicated relay radios A2 and A3 may be assigned to each of those nodes so that maximum bandwidth may be provided to each, resulting in radio A2 communicating with radio B2 and radio A3 communicating with radio C2 (FIG. 10C).

Figure 11:
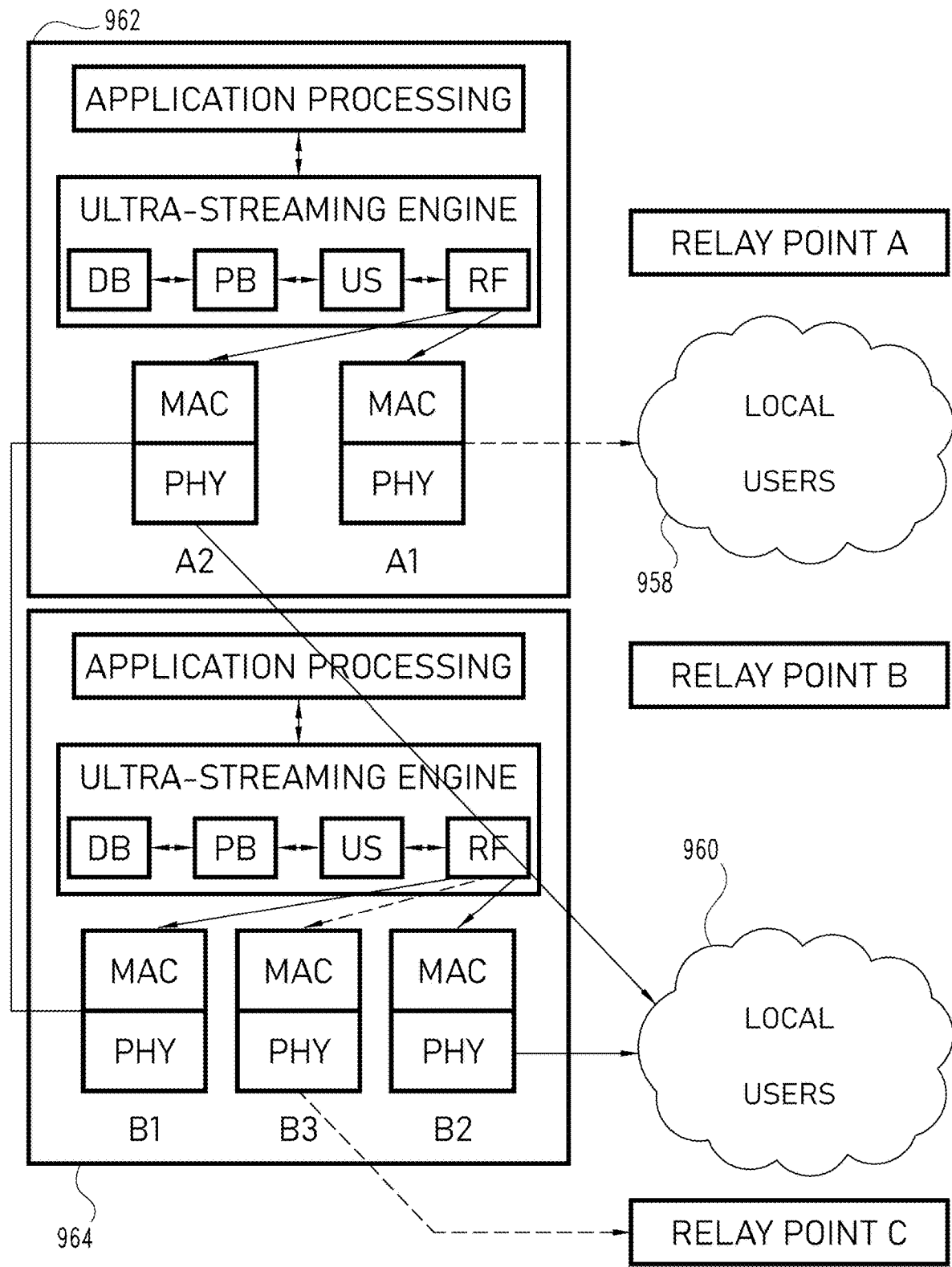
FIG. 11 illustrates one embodiment of multiple wireless management systems that cooperate to allocate transceiver resources between users.

For some embodiments, whether the wireless networking system is configured as a linear or radial architecture, there may be multiple transceivers assigned to a wireless node, and each node may have multiple transceivers assigned to a given user. FIG. 11 illustrates how multiple wireless management systems cooperate to efficiently allocate transceiver resources in such a situation. A first node management system 962 may control transceiver resources A1 and A2 within a first node. A second management system 964 may control transceiver resources B1, B2, and B3. The management systems 962 and 964 communicate with each other to determine the optimal resource allocation to service respective local users, at 958 and 960.

Thus, for the example shown in FIG. 11, the first local user 958 within the coverage of the first node may need bandwidth that may be sufficiently provided by transceiver A1 alone. The second local user 960, positioned within the vicinity of both the first and second nodes, may be assigned transceiver A2 from the first node, and transceiver B2 from the second node, thereby having access to twice the bandwidth. Other examples may involve partial transceiver allocations, where a portion of the transceiver bandwidth is allocated to a first user, and a second portion of the bandwidth allocated to a second user.

In some embodiments, a given wireless link may be configured as a variable duplex link. Each wireless management system may task the virtual MAC and virtual PHY to control respective transmit and receive cycles for one or more of the wireless transceivers. Varying the transmit and/or receive times may be accomplished in various ways, such as through programmable buffer resources and/or through programmable transmit and receive times. Further detail of such a variable duplex wireless link may be found in U.S. Pat. No. 9,788,305, titled METHOD AND APPARATUS FOR PROCESSING BANDWIDTH INTENSIVE DATA STREAMS USING VIRTUAL MEDIA ACCESS CONTROL AND PHYSICAL LAYERS, filed Oct. 29, 2014, and expressly incorporated herein by reference.

Those skilled in the art will appreciate that the embodiments described above enable efficient wireless access to wireless networking systems by users that might be outside the range of a single wireless access point. By employing linear and/or radial wireless access system architectures, and configuring available wireless transceiver resources optimally within each node, a given wireless network may be accessed with greater bandwidth and more efficiently.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A wireless networking device, comprising:
   a processing interface configured to, during use of the wireless networking device, interact with an application providing a data stream and having a wireless bandwidth requirement;
   first and second actual MAC interfaces connected to the processing interface;
   first and second actual PHY interfaces respectively connected to the first and second actual MAC interfaces;
   first and second wireless transceivers respectively associated with the first and second actual PHY interfaces, wherein the first and second wireless transceivers (i) are suitable for use in a wireless local area network, (ii) respectively have first and second bandwidth availabilities up to first and second actual bandwidths, and (iii) are adapted to respectively emit radio waves in first and second different bands of frequencies; and
   wherein the processing interface comprises,
      at least one virtual MAC interface,
      at least one resource monitoring interface that, during operation of the wireless networking device, provides information regarding the first and second bandwidth availabilities to the virtual MAC interface, and
      the virtual MAC interface being configured to, during use of the wireless networking device and in a manner transparent to any layer of the wireless networking device above the processing interface,
         (i) request or create a first association between a recipient and the first actual MAC and PHY interfaces and a second association between the recipient and the second actual MAC and PHY interfaces, and
         (ii) use the information provided to it by the resource monitoring interface to make allocation decisions with respect to first and second bandwidth availabilities to at least partially satisfy the bandwidth requirement of the data stream.

2. The wireless networking device of claim 1, wherein the first frequency band is specified in at least one member of the family of IEEE 802.11 standards that was in existence as of Oct. 30, 2013.

3. The wireless networking device of claim 1, wherein the second frequency band is specified in at least one member of the family of IEEE 802.11 standards that was in existence as of Oct. 30, 2013.

4. The wireless networking device of claim 1, wherein the at least one virtual MAC interface includes a decision block.

5. The wireless networking device of claim 1, wherein the at least one virtual MAC interface includes a processing block.

6. The wireless networking device of claim 1, wherein the at least one virtual MAC interface includes an ultra-streaming block.

7. The wireless networking device of claim 1, wherein the resource monitoring interface comprises at least one RF block.

8. The wireless networking device of claim 1, wherein the resource monitoring interface comprises multiple RF blocks.

9. The wireless networking device of claim 1, wherein the resource monitoring interface is configured to, during use of the wireless networking device, process the data stream before it is sent to any actual MAC interface.

10. The wireless networking device of claim 1, wherein the processing interface comprises multiple resource monitoring interfaces.

11. The wireless networking device of claim 1, wherein the processing interface comprises multiple virtual MAC interfaces.

12. The wireless networking device of claim 1, wherein the processing interface comprises a bandwidth allocator.

13. The wireless networking device of claim 1, wherein the resource monitoring interface is not contiguous with the virtual MAC interface.

14. The wireless networking device of claim 1, wherein the wireless networking device comprises a wireless access point.

15. The wireless networking device of claim 1, wherein the information provided by the resource monitoring interface to the virtual MAC interface is received by the resource monitoring interface directly from at least one of the first and second actual PHY interfaces.

16. The wireless networking device of claim 1, wherein the information provided by the resource monitoring interface to the virtual MAC interface is received by the resource monitoring interface directly from at least one of the first and second actual MAC interfaces.

17. The wireless networking device of claim 1, wherein the allocation decisions involve use of at least some of the first and second bandwidth availabilities.

18. The wireless networking device of claim 1, wherein the processing interface is configured to, when the wireless networking device is being used and in a manner transparent to any layer of the wireless networking device above the processing interface, (i) identify at least one portion of the actual bandwidth of one of the first and second wireless transceivers, the identified bandwidth portion comprising a set of given resources, and (ii) transmit the data stream to the recipient using only the given resources of the identified bandwidth portion that are not unavailable to thereby at least partially satisfy the bandwidth requirement.

19. The wireless networking device of claim 18, wherein the processing interface is configured to, when the wireless networking device is being used and in a manner transparent to any layer of the wireless networking device above the processing interface, (i) evaluate at least one data transfer characteristic of a first identified bandwidth portion of each of the first and second wireless transceivers, and (ii) transmit the data stream to the recipient using the first identified bandwidth portion of either the first or second wireless transceiver based upon a comparison of the evaluated data transfer characteristics.

20. The wireless networking device of claim 19, wherein the evaluation of the at least one data transfer characteristic comprises evaluation of bandwidth unavailability.

21. The wireless networking device of claim 20, wherein the evaluation of the at least one data transfer characteristic comprises evaluation of bandwidth unavailability and received signal strength of at least one communication from the recipient.

22. The wireless networking device of claim 18, wherein the first identified bandwidth portion of the first wireless transceiver comprises two non-contiguous portions of the bandwidth of the first wireless transceiver.

23. The wireless networking device of claim 22, wherein the first identified bandwidth portion of the second wireless transceiver comprises two non-contiguous portions of the bandwidth of the second wireless transceiver.

24. The wireless networking device of claim 18, wherein the allocation decisions are based at least upon a signal type associated with the data stream.

25. The wireless networking device of claim 18, wherein the processing interface is configured to, when the wireless networking device is being used and in a manner transparent to any layer of the wireless networking device above the processing interface, aggregate a first identified bandwidth portion of the first wireless transceiver with a first identified bandwidth portion of the second wireless transceiver to at least partially satisfy the bandwidth requirement of the application.

26. The wireless networking device of claim 18, wherein the processing interface is configured to, when the wireless networking device is being used and in a manner transparent to any layer of the wireless networking device above the processing interface, transmit the data stream to the recipient using the first wireless transceiver and to receive a second data stream that is transmitted from the recipient using the second transceiver.

27. The wireless networking device of claim 26, wherein the transmission of the data stream from the first wireless transceiver is at least partially simultaneous with the reception of the second data stream by the second wireless transceiver.

28. The wireless networking device of claim 27, wherein the transmission of the data stream from the first wireless transceiver is simultaneous with the reception of the second data stream by the second wireless transceiver.

29. The wireless networking device of claim 27, wherein a first identified portion of a bandwidth availability of a third wireless transceiver is aggregated with the first identified portion of the bandwidth of the first wireless transceiver to transmit the data stream to the recipient.

30. The wireless networking device of claim 27, wherein a first identified portion of a bandwidth availability of a third wireless transceiver is aggregated with the first identified portion of the bandwidth of the second wireless transceiver to receive the second data stream from the recipient.

* * * * *